United States Patent [19]
Rauznitz et al.

[11] Patent Number: 5,634,446
[45] Date of Patent: Jun. 3, 1997

[54] CRUISE CONTROL BASED RETARDER CONTROL

[75] Inventors: Peter Rauznitz, Columbus; Mary L. Till, Indianapolis; Jimmie J. Trueblood; Charles E. Goode, both of Columbus, all of Ind.

[73] Assignee: Cummins Engine Company, Inc., Columbus, Ind.

[21] Appl. No.: 522,574

[22] Filed: Sep. 1, 1995

[51] Int. Cl.$^6$ .................. F02D 13/04; B60K 31/02; B60K 41/20
[52] U.S. Cl. .................. 123/322; 180/179
[58] Field of Search .................. 123/321, 322; 180/178, 179

[56] References Cited

U.S. PATENT DOCUMENTS

| | | | |
|---|---|---|---|
| 4,211,193 | 7/1980 | Cox et al. | 123/352 |
| 4,374,422 | 2/1983 | O'Keefe, Jr. et al. | 364/426 |
| 4,662,332 | 5/1987 | Bergmann et al. | 123/321 |
| 4,742,806 | 5/1988 | Tart, Jr. et al. | 123/322 |
| 5,003,483 | 3/1991 | Hedstrom | 180/179 |
| 5,117,790 | 6/1992 | Clarke et al. | 123/321 |
| 5,121,723 | 6/1992 | Stepper et al. | 123/322 |
| 5,155,687 | 10/1992 | Katayama | 364/426.04 |
| 5,197,564 | 3/1993 | Nishimura et al. | 180/179 |
| 5,224,045 | 6/1993 | Stasell | 180/179 |
| 5,243,523 | 9/1993 | Stepper et al. | 180/179 |
| 5,315,900 | 5/1994 | Teeter | 477/165 |
| 5,343,780 | 9/1994 | McDaniel et al. | 180/179 |
| 5,445,128 | 8/1995 | Letang et al. | 123/436 |
| 5,483,927 | 1/1996 | Letang et al. | 180/179 |

*Primary Examiner*—Willis R. Wolfe
*Attorney, Agent, or Firm*—Woodard, Emhardt, Naughton, Moriarty & McNett

[57] ABSTRACT

A cruise control based retarder control. If the vehicle speed exceeds the cruise control set speed, the cruise control system continuously checks the vehicle speed and acceleration order to determine the optimum auxiliary brake level based upon the amount of overspeed and acceleration. The cruise control system allows the vehicle driver to select which auxiliary brakes will be applied to slow down the vehicle to the desired speed by means of the normal cabin brake switches, limited by the determined optimum brake level. The driver can therefore control which auxiliary brakes are applied, however the application of these brakes is controlled by the cruise control system without the need to exit cruise control mode. Operation of the auxiliary brakes by the cruise control system will normally reset in increased fuel economy over prior art systems which require exiting of the cruise control system, manual activation of the auxiliary brakes and resumption of the cruise control system.

14 Claims, 5 Drawing Sheets

CRUISE CONTROL BASED RETARDER CONTROL

TECHNICAL FIELD OF THE INVENTION

The present invention relates generally to control systems and, more particularly, to a cruise control based retarder control.

BACKGROUND OF THE INVENTION

The use of a vehicle's brake system to slow the vehicle results in high loads being placed upon the brake system, causing brake pad wear and the production of large amounts of heat. In the case of heavier vehicles, various types of auxiliary brakes are used in addition to ordinary wheel brakes. Such auxiliary brakes (for example, an exhaust gas engine brake) allow for prolonged application of the auxiliary brakes without the vehicle's main brakes being used. As a result, the main brakes, which conventionally comprise friction brakes of the disc brake or drum brake type, are prevented from over-heating, thereby reducing the associated risk of brake failure. With the use of auxiliary brakes, increased operating safety is thus obtained in the braking system, since the auxiliary brakes may be used for constant speed keeping purposes and for moderate decelerations, while the vehicle's main brakes are saved for violent brakings provoked by unexpected disturbances in the traffic flow.

When a vehicle's speed is being maintained at a constant level by means of a cruise control system, the occurrence of a downhill slope may cause the vehicle to undesirably accelerate. The cruise control system will attempt to reduce the vehicular speed to the desired speed by reducing the amount of throttle commanded and therefore the amount of fuel delivered to the engine. When the throttle has been reduced to zero percent and the vehicle continues to travel at a speed in excess of the desired speed, current cruise control systems require the driver to deactivate the cruise control prior to activation of the auxiliary brakes. Therefore, if the vehicle is accelerating downhill, the driver must exit cruise control mode in order to slow the vehicle using the auxiliary brakes, thereby inconveniencing the driver. Additionally, some drivers will activate the auxiliary brakes too early and deactivate them too late during the deceleration episode, thus resulting in wasted fuel. There is therefore a need for a cruise control system which will allow application of the auxiliary brakes without exiting cruise control. The present invention is directed toward meeting these needs.

SUMMARY OF THE INVENTION

The present invention relates to a cruise control based retarder control. If the vehicle speed exceeds the cruise control set speed, the cruise control system continuously checks the vehicle speed and acceleration in order to determine the optimum auxiliary brake level based upon the amount of overspeed and acceleration. The cruise control system allows the vehicle driver to select which auxiliary brakes will be applied to slow down the vehicle to the desired speed by means of the normal cabin brake switches, limited by the determined optimum brake level. The driver can therefore control which auxiliary brakes are applied, however the application of these brakes is controlled by the chaise control system without the need to exit cruise control mode. Operation of the auxiliary brakes by the cruise control system will normally result in increased fuel economy over prior art systems which require exiting of the cruise control system, manual activation of the auxiliary brakes and resumption of the cruise control system.

In one form of the invention, a method for controlling application of a vehicle's auxiliary brakes without exiting cruise control is disclosed, comprising the steps of: (a) providing a plurality of auxiliary brakes operable to resist a forward motion of the vehicle when activated; (b) receiving a first commanded brake state from a driver of the vehicle, wherein the first commanded brake state selects which of the plurality of auxiliary brakes the driver wishes to be activated; (c) determining a second commanded brake state by comparing a current vehicle acceleration with at least one predetermined acceleration limit; (d) selecting one of the first or second commanded brake states which commands activation of a lesser number of the plurality of auxiliary brakes than another one of the first or second commanded brake states; and (e) activating the auxiliary brakes selected in step (d).

In another form of the invention a method for controlling application of a vehicle's auxiliary brakes without exiting cruise control is disclosed, comprising the steps of: (a) providing a plurality of auxiliary brakes operable to resist a forward motion of the vehicle when activated; (b) receiving a first commanded brake state from a driver of the vehicle, wherein the first commanded brake state selects which of the plurality of auxiliary brakes the driver wishes to be activated; (c) determining a current second commanded brake state by comparing a current vehicle acceleration with at least one predetermined acceleration limit; (d) redetermining the second commanded brake state by comparing a current vehicle speed with at least one predetermined speed limit if the current second commanded brake state determined in step (c) is equal to a previous second commanded brake state; (e) selecting one of the first commanded brake state or the second current commanded brake state which commands activation of a lesser number of the plurality of auxiliary brakes than another one of the first or second commanded brake states; and (f) activating the auxiliary brakes selected in step (e).

DESCRIPTION OF THE PREFERRED EMBODIMENT

Figure 1:
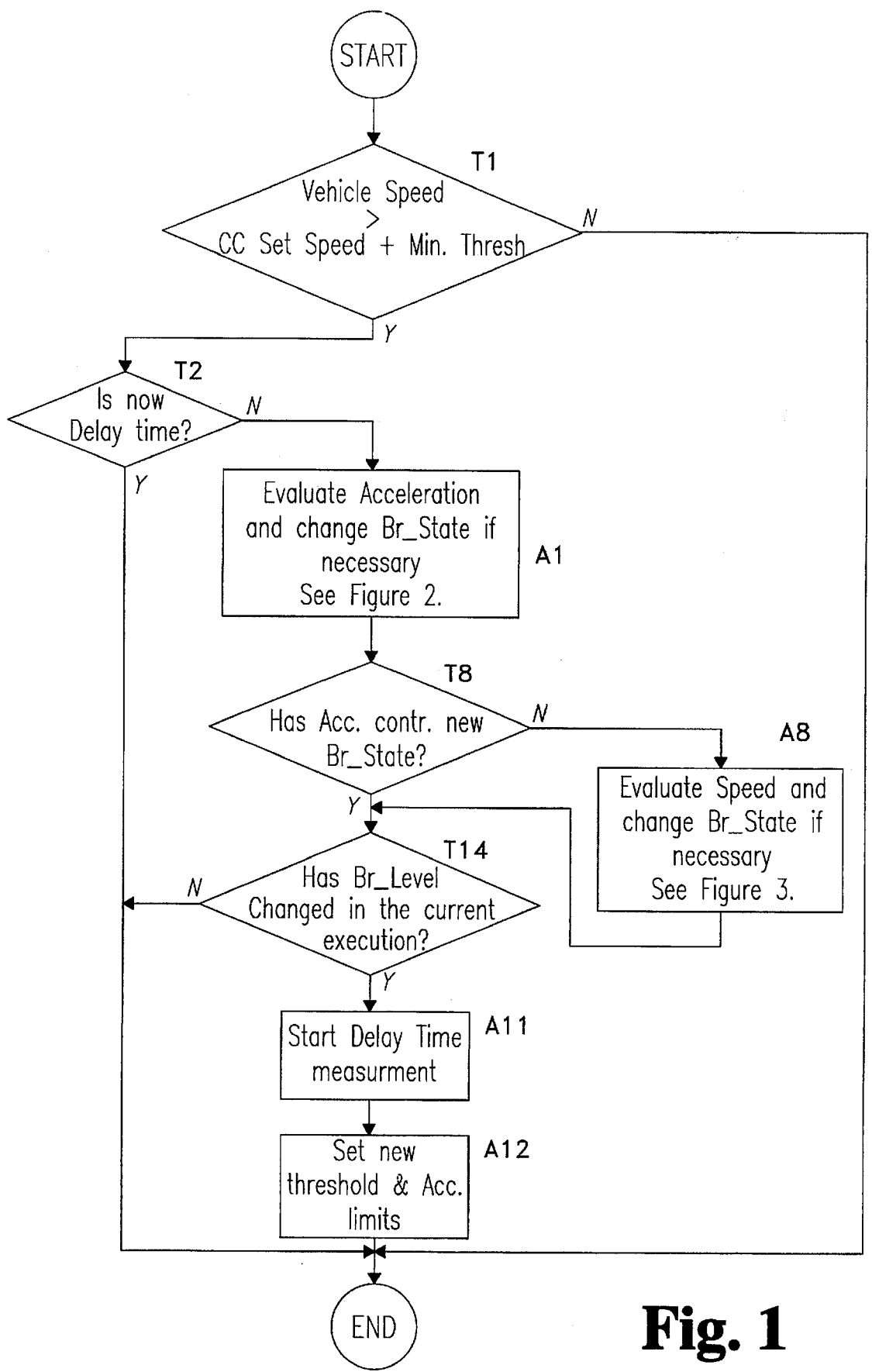
FIG. 1 is a process flow diagram of a first embodiment method of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention allows for control of the auxiliary brakes by the cruise control system based upon the current vehicle speed, the current rate of acceleration or deceleration of the vehicle, and the settings of the normal driver actuated cabin auxiliary brake switches. The main method of the present invention is illustrated schematically in FIG. 1. The process begins at T1 by the cruise control system checking to see if the current vehicle speed exceeds the cruise control set speed plus a calibratable minimum threshold speed. If the current vehicle speed does not exceed the cruise control set speed plus the minimum threshold speed (T1=N), then the cruise control system does not execute any action. If, however, the current vehicle speed exceeds the cruise control set speed plus the minimum threshold speed (T1=Y), then the process moves to T2 where it is determined whether the system is currently within a time delay. The purpose of the time delay is described in greater detail hereinbelow. If the system is currently executing a time delay (T2=Y), then no further action is taken and the process ends. If, however, there is no time delay currently being executed (T2=N), then the process moves to A1.

Figure 2:
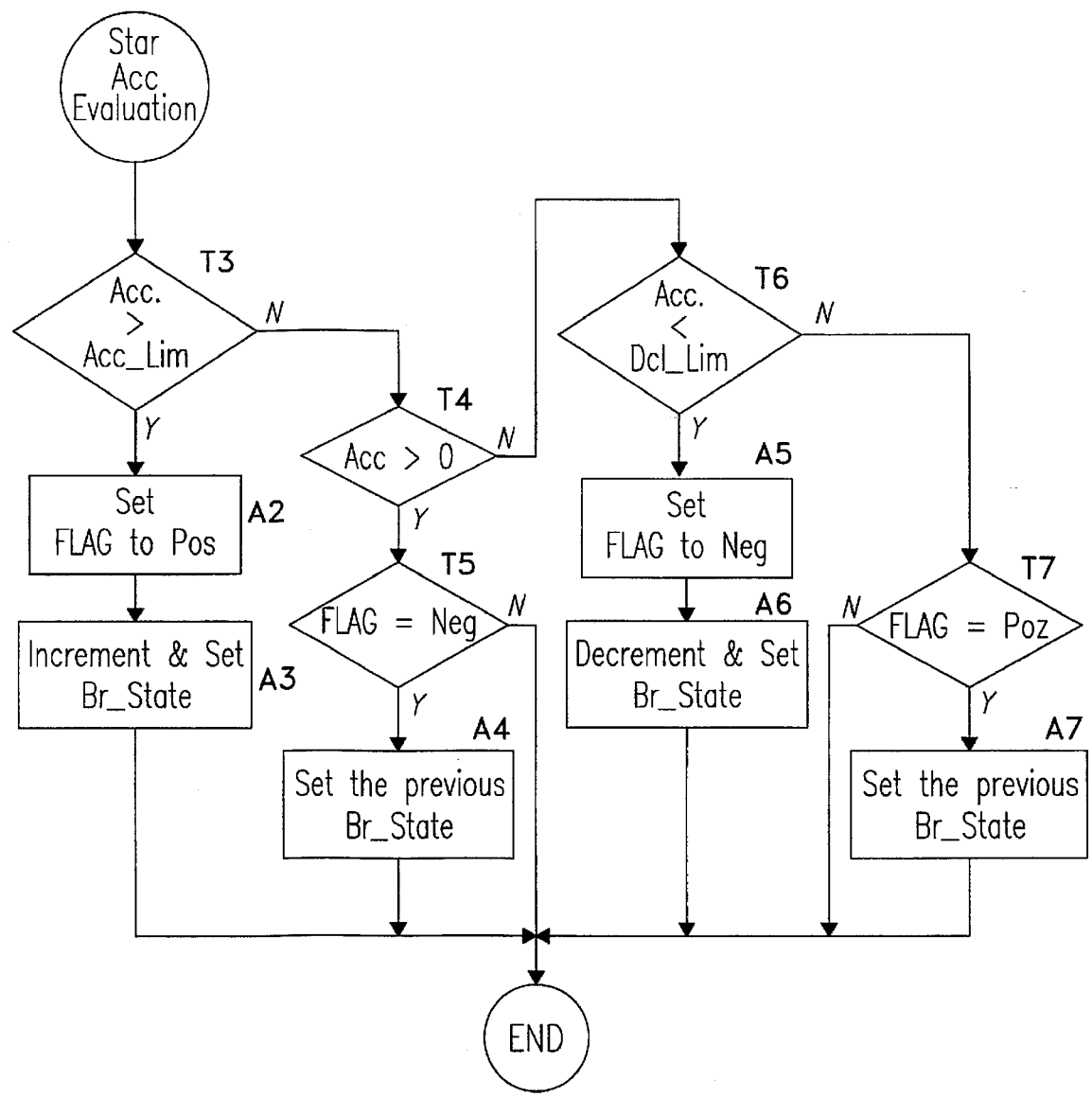
FIG. 2 is a process flow diagram of a vehicle acceleration evaluation method of the present invention.

The action A1 evaluates the current vehicle acceleration level and changes the brake state if necessary. The brake state as used herein refers to the number of auxiliary brakes which the cruise control system is commanding to be activated. The details of action A1 are illustrated in FIG. 2, and begin with the test T3 which determines if the current vehicle acceleration level exceeds a predetermined acceleration limit. If the current acceleration exceeds the acceleration limit (T3=Y), then an internal software flag is set to a positive value at A2 and the brake state is incremented at action 3. Incrementing the brake state indicates that the cruise controller is requesting that an additional auxiliary brake be applied. After action A3, the process returns to FIG. 1.

If the vehicle acceleration is not greater than the predefined acceleration limit (T3=N), then the process determines at T4 whether the current vehicle acceleration is greater than zero. If the acceleration is greater than zero (T4=Y), then the process determines at T5 if the internal software flag has a negative value. This is done in order to determine if there has been previous acceleration-induced braking. If the current vehicle acceleration is greater than zero (T4=Y) but the software flag is not negative (T5=N), then no further braking action is requested at this time because the braking level has previously been increased in response to the vehicle acceleration or the vehicle speed. The process therefore returns to FIG. 1. If, however, the software flag is negative (T5=Y), then the commanded brake state is changed at A4 to the brake state that existed prior to the current brake state. Therefore, if the brake state is decremented at A6 (see below) and the vehicle beings to accelerate, the brake state will be returned to its previous value. The process then returns to FIG. 1. If it is determined at test T4 that the acceleration of the vehicle is not greater than zero, then test T6 determines whether the acceleration of the vehicle is less than a predetermined deceleration limit. If the current vehicle acceleration is less than the predetermined deceleration limit (T6=Y), then the internal software flag is set to a negative value at A5 and the commanded brake state is decremented (i.e. reduced braking is commanded) at action A6. The process then returns to FIG. 1. If, however, the current acceleration is not less than the predetermined deceleration limit (T6=N), then test T7 determines whether the software flag has a positive value. If the flag is not positive (T7=N), then the process performs no further action and returns to FIG. 1. If, on the other hand, the software flag has a positive value (T7=Y), then the controller commands the previous brake state at action A7 and returns to FIG. 1. It will be appreciated by those skilled in the art that the change, if any, in the brake state requested by the cruise controller as a result of the process of FIG. 2 depends upon the current acceleration of the vehicle as well as the past braking commands requested by the controller (as indicated by the polarity of the software flag).

Figure 3:
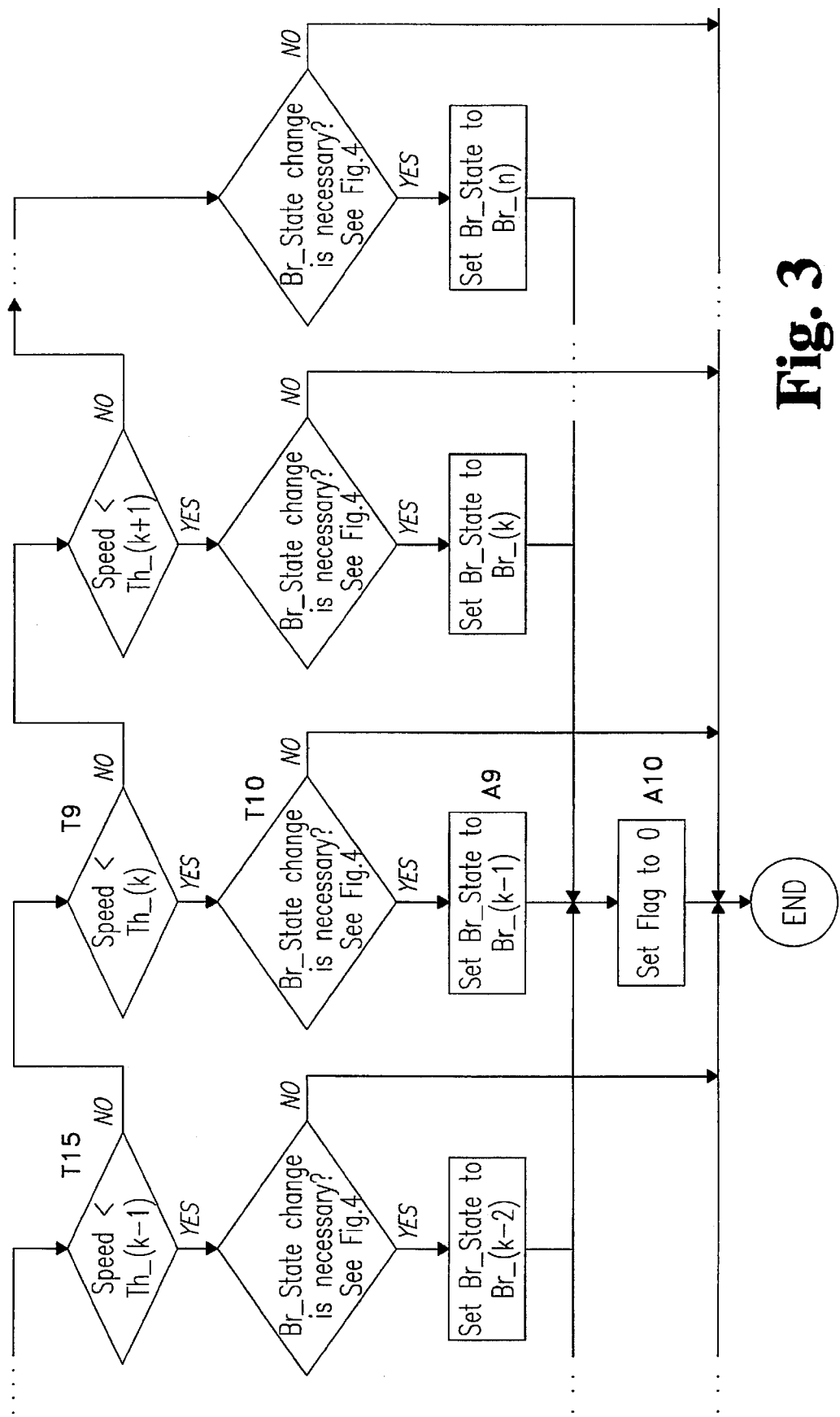
FIG. 3 is a process flow diagram of a vehicle speed evaluation method of the present invention.

Returning now to FIG. 1, after action A1 has been completed, the process then determines at test T8 whether the action A1 has resulted in a new brake state. If the action A1 has not resulted in a new brake state (T8=N), then the process executes action A8 which evaluates the current vehicular speed and determines if a change in the brake state is necessary. Action A8 is illustrated in greater detail in FIG. 3.

In general, the auxiliary brakes of a vehicle comprise (n) different brake states, which represent (n) brake levels. For example, the Cummins N14 engine incorporates a compression brake having three brake levels, while the Cummins M11 engine incorporates a compression brake having two brake levels. For (n) brake levels, (n) brake threshold speeds can be defined, these threshold speeds being predefined values greater than the cruise control set speed. Therefore, the process of FIG. 3 contains a general illustration utilizing the variable (k), it being understood by those skilled in the art that the process flow diagram of FIG. 3 may be expanded or contracted in proportion to the actual value of (n). The portion of the process flow diagram illustrated in FIG. 3 would be complete for a vehicle having three auxiliary brake levels (n=3).

Figure 4:
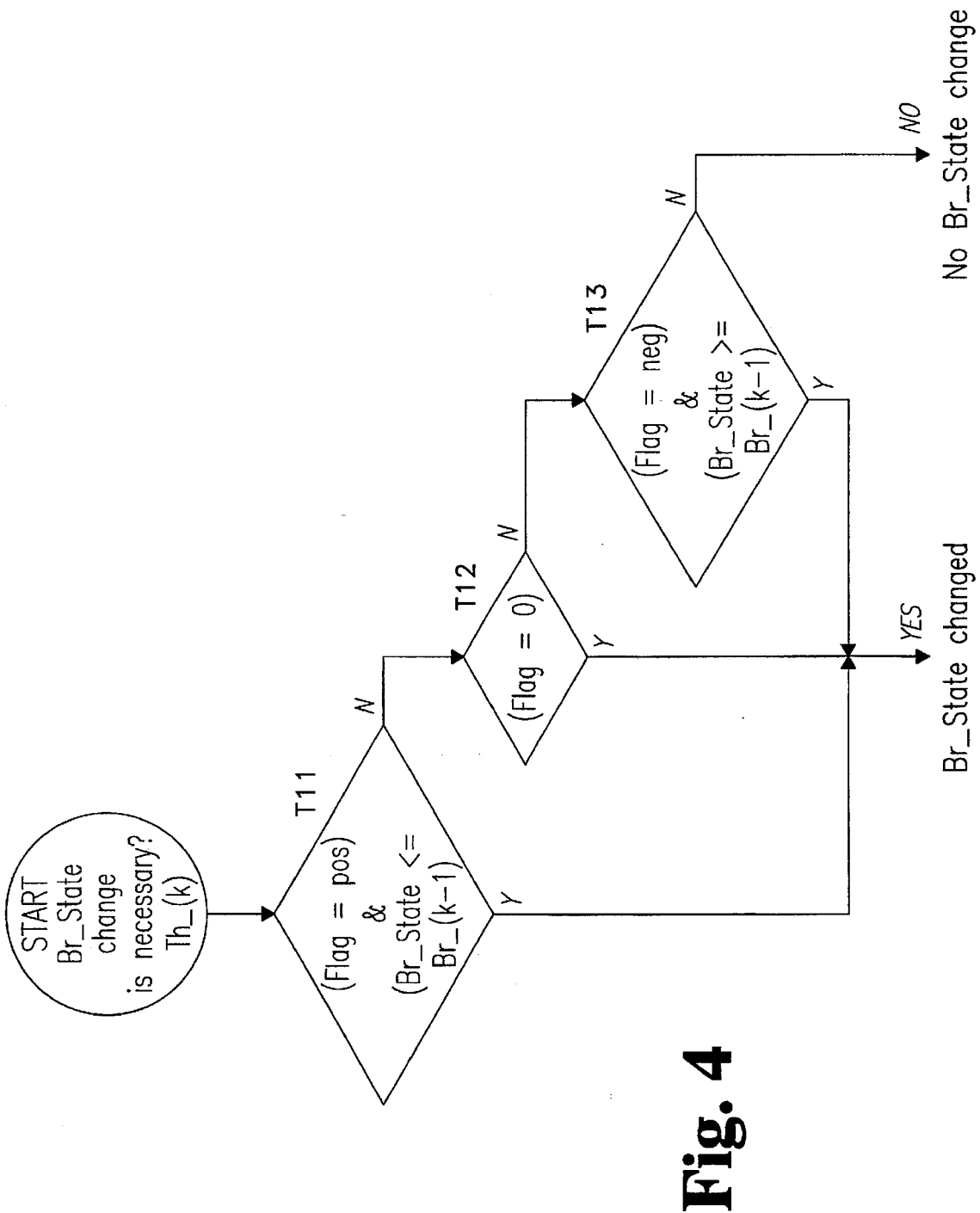
FIG. 4 is a process flow diagram of a brake state change method of the present invention.

If the current vehicle speed is determined to exceed the (k−1) threshold speed value (T15=N), but the current vehicle speed is below the (k) threshold speed value (T9=Y), then the process determines at test T10 whether a brake state change is necessary. The test of T10 is illustrated in greater detail in FIG. 4. As illustrated in FIG. 4, a brake state change is necessary if the software flag is positive and the current brake state is lower than or equal to the (k−1) brake state (T11=Y), or if the software flag is zero (T12=Y), or if the software flag is negative and the current brake state is greater than or equal to the (k−1) brake state (T3=Y). If none of these tests are met, then no brake state change is required and the process returns to FIG. 1. If, however, the process of FIG. 4 determines that a brake state change is required, then the process of FIG. 3 sets the brake state to the (k−1) brake state at action A9. The software flag is then set to zero at action A10 and the process returns to FIG. 1. It will be appreciated by those skilled in the art that a process similar to that of FIG. 4 is utilized for the other vehicle speed thresholds of FIG. 3, it only being necessary that the designations (k) and (k1) in FIG. 4 be changed to correspond to the speed threshold being evaluated.

Returning once again to FIG. 1, the process continues at test T14 which determines whether the commanded brake level has been changed in the current execution of the process of FIG. 1. If there has been no change in the brake level (T14=N), then the process ends. If, however, the commanded brake level has changed during the current execution (T14=Y), then a time delay measurement is begun at action A11 and new speed threshold and acceleration limits are set at action A12. The time delay in action A11 must be inserted before a new acceleration or speed evaluation is undertaken because the mechanical system which the cruise controller is controlling (brake, control hydraudlics, etc.) has a physical time delay. Such mechanical systems need time to turn on or off and to develop the new speed/acceleration of the vehicle in response thereto. Without this time delay, the relatively quick electronic cruise control response would not allow sufficient time for the mechanical system to react. The new speed threshold and acceleration limits which are set at action A12 are programmed into the cruise controller. The controller can use different acceleration limits and speed thresholds in different brake states. Typically, in higher brake levels the limits are set lower. For example, when the second brake is turned on and the vehicle is still accelerating, a lower acceleration limit would be desirable to turn on the third brake in order to prevent the vehicle from achieving excessive speed. Therefore, the cruise controller determines which acceleration limit or speed threshold to use at action A12 depending upon the current braking level. In order to avoid on/off oscillation of the brakes, the cruise controller establishes a hysteresis for the brake thresholds. Therefore, once a particular brake level is turned on, the applicable threshold level for turning the brake off is set to a lower speed (speed threshold-hysteresis value). Therefore, the vehicle must slow down to the lower speed level in order to turn off the currently applied brake level.

Figure 5:
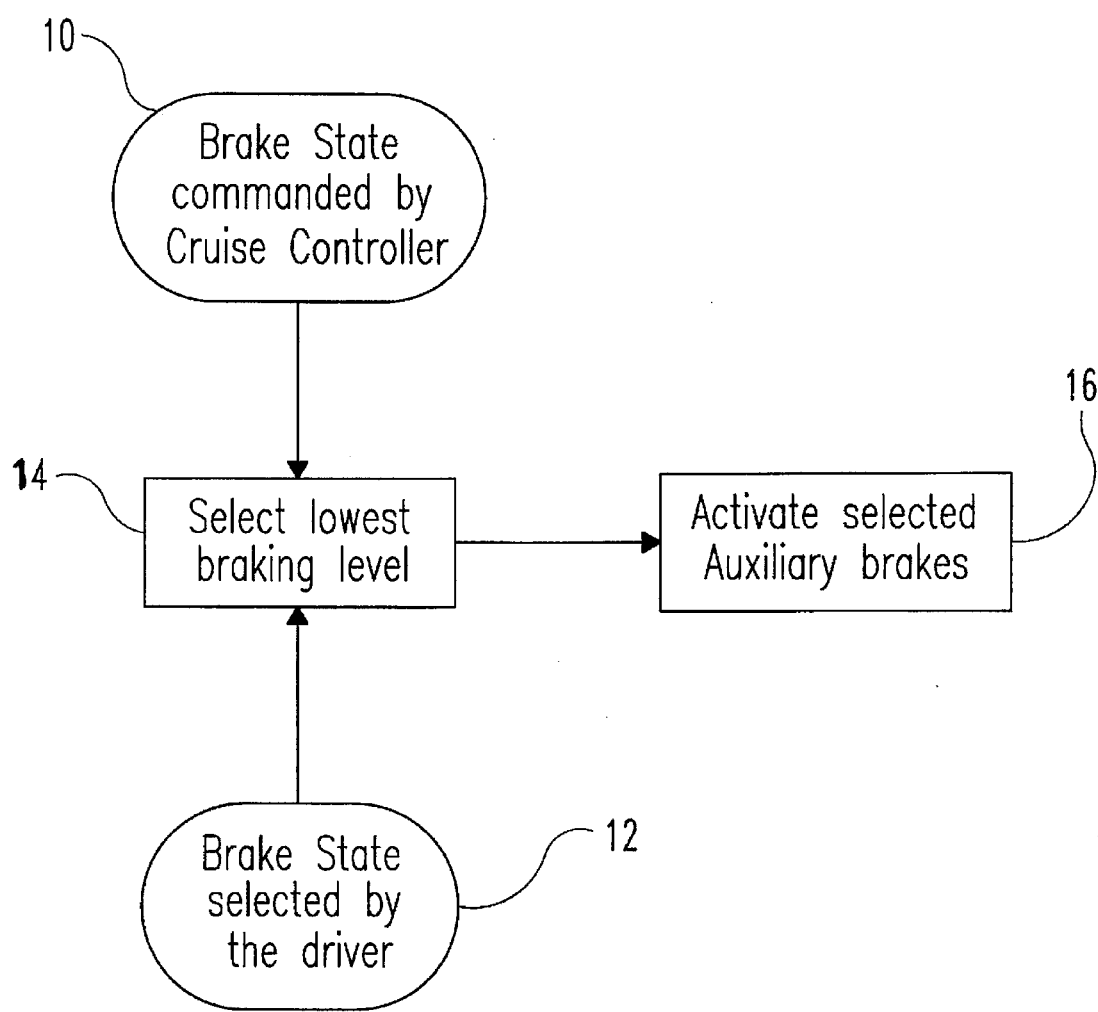
FIG. 5 is a further flow diagram associated with the present invention.

The cruise control controller will therefore determine the desired number of auxiliary brakes to be applied at any given instant in accordance with the process illustrated by FIGS. 1–4. This brake state commanded by the cruise controller is illustrated as block 10 in FIG. 5. Because each of the vehicle's auxiliary brakes may be enabled or disabled by a respective switch in the driver's cabin, the driver may also select a brake state for the vehicle as illustrated by block 12 of FIG. 5. As illustrated by block 14 of FIG. 5, the controller compares the brake state commanded in block 10 with the brake state commanded by the driver in block 12 and selects the brake state which commands the lowest braking level. The auxiliary brakes selected by this brake state are then activated by the controller at block 16.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for controlling application of a vehicle's auxiliary brakes without exiting cruise control, comprising the steps of:
   (a) providing a plurality of auxiliary brakes operable to resist a forward motion of the vehicle when activated;
   (b) receiving a first commanded brake state from a driver of the vehicle, wherein the first commanded brake state selects which of the plurality of auxiliary brakes the driver wishes to be activated;
   (c) determining a second commanded brake state by comparing a current vehicle acceleration with at least one predetermined acceleration limit;
   (d) selecting one of the first or second commanded brake states which commands activation of a lesser number of the plurality of auxiliary brakes than another one of the first or second commanded brake states; and
   (e) activating the auxiliary brakes selected in step (d).

2. The method of claim 1, wherein the auxiliary brakes comprise an engine compression brake.

3. The method of claim 1, wherein step (b) comprises sensing a state of each of a plurality of vehicle cabin switches corresponding to respective ones of the plurality of auxiliary brakes.

4. The method of claim 1, wherein step (c) comprises:
   (c. 1) setting the second commanded brake state equal to a current commanded brake state incremented by one if the current vehicle acceleration is greater than a first acceleration limit;
   (c. 2) setting the second commanded brake state equal to a previously commanded brake state it the current vehicle acceleration is greater than a second acceleration limit; and
   (c. 3) setting the second commanded brake state equal to the current commanded brake state decremented by one of the current vehicle acceleration is less than a third acceleration limit.

5. The method of claim 4, wherein the first acceleration limit is a maximum tolerable vehicle acceleration.

6. The method of claim 4, wherein the second acceleration limit is zero.

7. The method of claim 4, wherein the third acceleration limit is a maximum tolerable vehicle deceleration.

8. A method for controlling application of a vehicle's auxiliary brakes without exiting cruise control, comprising the steps of:
   (a) providing a plurality of auxiliary brakes operable to resist a forward motion of the vehicle when activated;
   (b) receiving a first commanded brake state from a driver of the vehicle, wherein the first commanded brake state selects which of the plurality of auxiliary brakes the driver wishes to be activated;
   (c) determining a current second commanded brake state by comparing a current vehicle acceleration with at least one predetermined acceleration limit;
   (d) redetermining the second commanded brake state by comparing a current vehicle speed with at least one predetermined speed limit if the current second commanded brake state determined in step (c) is equal to a previous second commanded brake state;
   (e) selecting one of the first commanded brake state or the second commanded current brake states which commands activation of a lesser number of the plurality of auxiliary brakes than another one of the first or second commanded brake states; and
   (f) activating the auxiliary brakes selected in step (e).

9. The method of claim 8, wherein the auxiliary brakes comprise an engine compression brake.

10. The method of claim 8, wherein step (b) comprises sensing a state of each of a plurality of vehicle cabin switches corresponding to respective ones of the plurality of auxiliary brakes.

11. The method of claim 8, wherein step (c) comprises:
    (c. 1) setting the second commanded brake state equal to a current commanded brake state incremented by one if the current vehicle acceleration is greater than a first acceleration limit;
    (c. 2) setting the second commanded brake state equal to a previously commanded brake state if the current vehicle acceleration is greater than a second acceleration limit; and
    (c. 3) setting the second commanded brake state equal to the current commanded brake state decremented by one if the current vehicle acceleration is less than a third acceleration limit.

12. The method of claim 11, wherein the first acceleration limit is a maximum tolerable vehicle acceleration.

13. The method of claim 11, wherein the second acceleration limit is zero.

14. The method of claim 11, wherein the third acceleration limit is a maximum tolerable vehicle deceleration.

* * * * *

UNITED STATES PATENT AND TRADEMARK OFFICE
CERTIFICATE OF CORRECTION

PATENT NO. : 5,634,446

DATED : June 3, 1997

INVENTOR(S) : Rauznitz, Till, Trueblood and Goode

It is certified that error appears in the above-identified patent and that said Letters Patent is hereby corrected as shown below:

In block 57 of the title page, line 4, please insert --in-- before "order".

In column 1, line 62, please change "chaise" to --cruise--.

In column 4, line 39, please change "T3" to --T13--.

In column 4, line 49, please change "k1" to --k-1--.

Signed and Sealed this

Second Day of December, 1997

Attest:

BRUCE LEHMAN

Attesting Officer

Commissioner of Patents and Trademarks